July 30, 1935.    C. T. WALTER    2,009,824
MEASURING AND PACKAGING METHOD
Filed Sept. 16, 1932
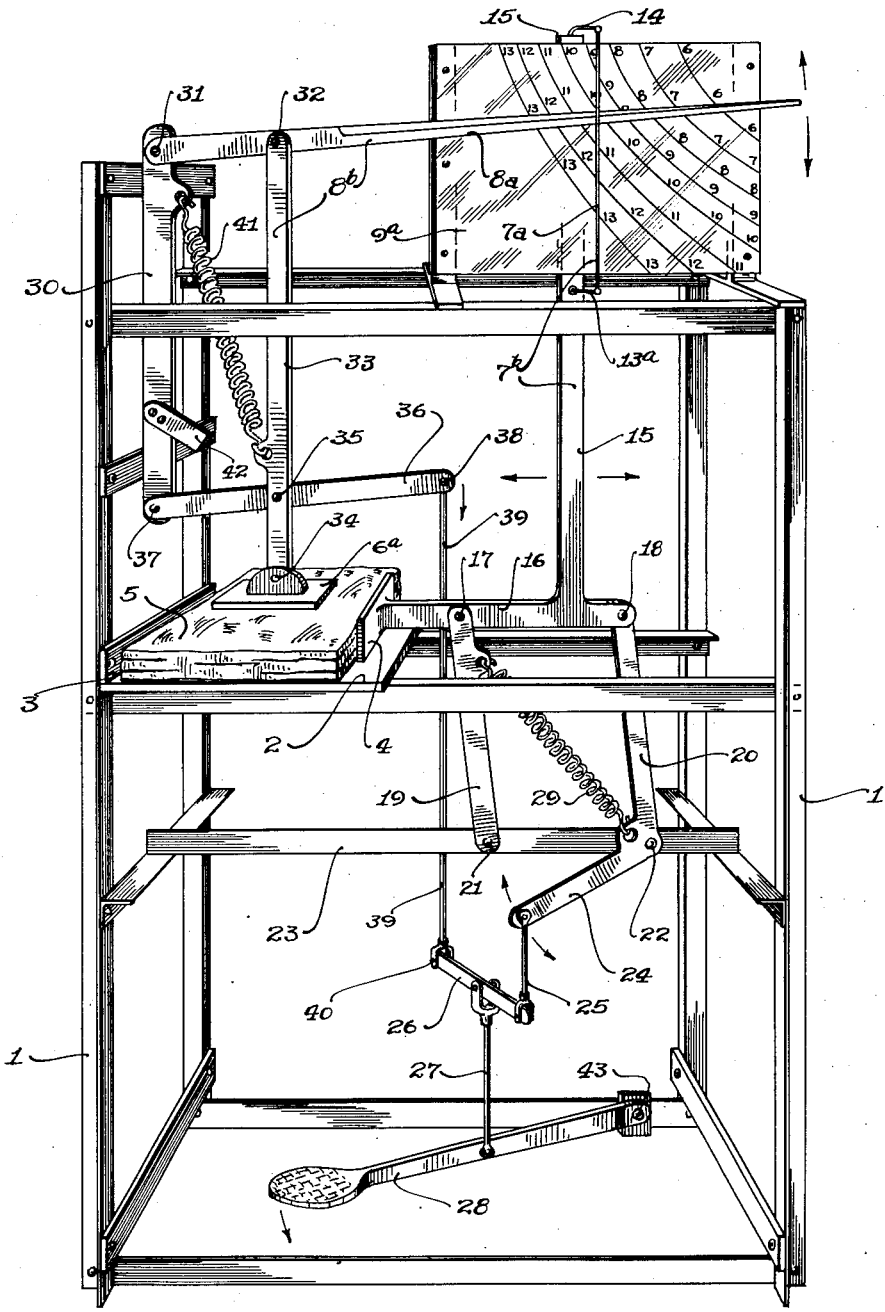
Charles T. Walter
INVENTOR
WITNESS
BY
ATTORNEY Patented July 30, 1935

2,009,824

UNITED STATES PATENT OFFICE 2,009,824

MEASURING AND PACKAGING METHOD

Charles T. Walter, Chicago, Ill., assignor to Industrial Patents Corporation, Chicago, Ill., a corporation of Delaware Application September 16, 1932, Serial No. 633,471

5 Claims. (Cl. 99—8)

The present invention relates to the automatic "weighing" of bacon by volumetric means.

The invention according to a general and broad aspect thereof contemplates the employment of the weighing or determining by volumetric means of slabs of bacon, whereby selected slabs of bacon having cross-sectional areas within certain limits can be obtained and collected.

The invention according to another object or aspect thereof contemplates the deliberate reshaping of said selected and collected slabs of bacon so as to produce a series of shaped slabs each having the same defined cross-sectional area, and thereafter employing such shaped slabs as the material to be cut in continuous slicing and packaging systems already in use.

The applicant has in mind the details of apparatus which will make convenient the measuring and classifying of bacon slabs for pressing so as to bring about the desired results with the minimum amount of labor and with a minimum amount of pressing deformation; also suitable pressing apparatus. An apparatus embodying fundamentals of a classifying and sorting machine is shown and described in my application for Letters Patent, entitled Classifying means, filed September 2, 1932, Serial No. 631,521, Patent No. 1,989,252, patented January 29, 1935.

The apparatus described and claimed in the said application for patent is shown in the accompanying drawing.

In said drawing there is shown in perspective a classifying and indicating machine by which the invention may be realized. The machine shown in said drawing can be employed to indicate the number of slices of bacon of uniform thickness that will weigh a fixed amount, for example one-half pound. The successful use depends upon two factors (a) that the density throughout the length of the slab is substantially constant at all points, and (b) that the cross section of a slab of bacon is very close to a rectangle throughout the length of the slab. The apparatus shown in said figure performs its function by measuring the cross-sectional area of the bacon slab and indicates this quantity in terms of the number of slices per unit of weight on a suitable scale, or in other words in conjunction with a suitable chart.

Reference will now be made to the drawing in detail. The reference character 1 represents a rigid framework to which the several moving parts are attached and by which the several parts of the machine are carried. 2 represents a flat horizontally and transversely extending table on which rests or is placed a bacon slab to be measured. 3 is a fixed longitudinally extending side plate or member constituting a longitudinally extending abutment against which the bacon slab is forced by a transversely moving longitudinally extending side plate 4. 5 indicates a bacon slab in position to be measured.

This measuring is accomplished by positioning of the transversely movable longitudinally extending side plate 4 against the edge of the bacon slab and by positioning of a vertically movable top plate 6a against the upper surface of the bacon slab. This top plate 6a may be considered as a transversely and horizontally extending top plate which is movable along a vertical path towards and from the table 2. The locations of plates 4 and 6a respectively control the positions of indicating means or members 7b and 8b respectively. The indicating means 7b includes or comprehends a vertically extending indicating wire 7a and the indicating means 8b comprehends or includes the pivoted relatively horizontally extending indicating arm 8a. These indicating means operate in conjunction with the chart 9a bearing lines as 6, 7, 8, 9, 10, 11, 12, and 13. These indicating members or arms may be considered as functionally associated with respect to the chart. Each of these lines is marked with a series of figures corresponding thereto as Figures 6, 7, 8, 9, 10, 11, 12, and 13 which are an indication of the number of slices of bacon per unit of weight. The members 7a and 8a of the indicating means are operatively arranged in respect to the chart so that at the place or in the immediate vicinity where said members intersect or cross a reading can be taken from the marked lines thereat. In other words, the intersecting of members 7a and 8a over one of the curved lines on the chart is an indication of the number of slices per unit of weight. The number marked on said curved line is a direct reading of the number of slices of a certain thickness required to make up the desired weight unit.

The indicating means or member 7b, as previously pointed out, comprises a thin wire 7a stretched between brackets 13a and 14, which brackets are in turn supported by a vertical arm 15 rigidly fastened to a part of the mechanism that effects horizontal motion in a transverse direction of the movable longitudinally extending side plate. In fact the vertical arm 15 as shown is rigidly fastened to the horizontally transversely extending bar 16 which is in turn integral with side plate 4. This bar 16 is pivotally secured at 17 and 18 to the upper end of links 19 and 20, the latter of which may be considered as part of a bell crank lever 24, constituting part of a parallel motion mechanism. These links 19 and 20 are pivotally secured as at 21 and 22 to a fixed frame member 23. This construction, as previously indicated, allows the plate 4 to move in a horizontal but transverse direction because of the parallel motion mechanism just described. Any transverse motion of plate 4 brings about an equal or corresponding motion of indicating means or members 7b and the vertically extending indicating wire 7a thereof.

The bell crank lever 24 serves as the member by which motion is transmitted from a foot lever 28, hereinafter referred to, to and through the parallel motion mechanism, to the transversely movable side plate 4 and to the indicating means 7b associated therewith. This bell crank lever 24 is operated from the foot pedal 28 through the medium of link 25, the upper end of which is pivotally connected to bell crank 24, equalizing bar 26 and rod 27, the latter of which is pivotally connected at its lower end to foot pedal 28. The pressing of the foot downwardly on the lever 28 effects a transverse movement towards the left of the side plate 4 until the latter is arrested against further movement because of its contacting with a bacon slab upon the table. Spring 29 serves to return the side plate 4 to its extreme right-hand position and to simultaneously lift the foot pedal lever when the pressure of the foot is removed from the latter.

The indicating means 8b comprises straight lever 8a pivoted at 31 to a fixed frame member 30 and an inspection of the figure readily shows how the indicating member 8a crosses or in effect "intersects" the vertically extending wire or indicating wire 7a. At an intermediate or midpoint 32 of the lever 8a there is pivotally connected the upper end of a vertical rod 33 to the lower end of which rod there is pivotally connected the plate 6a as at the point 34. At intermediate point 35, rod 33 is pivotally connected to link or lever 36, one end of which link or lever is pivoted to link or link member constituting part of lever 36. One end of the link or lever is pivoted at 37 to the fixed frame member 30 and the other end of the lever is pivotally connected at 38 to one end of rod 39. The other end of the rod 39 is pivoted to equalizing bar 26 as at 40. The link or lever mechanism just described provides a parallel motion mechanism for vertically positioning the plate 6a. The parallel motion mechanism just described is operated to effect downward movement of the plate 6a by downward pressure of the foot on the lever 28. The upward movement of the plate 6a is effected by means of the tension spring 41 hereinafter referred to. Because of this construction any vertical displacement of the top plate 6a will cause lever or arm 8a to rotate about the pivotal point 31. As the distance between the points 31 and 32 on lever 8a is small as compared with the distance between the points 32 and the normal indicating section of lever 8a, the motion or position of the plate 6a is in effect magnified. In other words a small vertical motion or variation in position of the vertical plate due to the variation in a thickness as between two bacon slabs will cause a relatively large motion of lever 8a across chart 9a.

The spring 41 previously referred to serves to retract the parallel motion mechanism and to thereby hold the plate 6a in its extreme uppermost position in reference to the table under which conditions the link portion of lever 36 rests against any suitable stop as for example stop 42. It is clear from the construction shown that a downward displacement of foot pedal 28 which is pivoted to fixed frame 1 at point 43 will cause bacon contacting elements 4 and 6a to close in against the bacon slab 5.

The equalizing bar 26 in effect serves as a compensating means whereby both contacting elements 4 and 6a can always close in against a slab of bacon regardless of its breadth and thickness. In other words, even though the bacon slabs vary as to thickness and also as to breadth still because of this equalizing member the compensation can take place whereby the indicating mechanisms can conjointly function.

The chart 9a is secured to and carried by the frame in any suitable manner and it will also be seen that the indicating members 7a and 8a will operatively associate with this chart. In other words so that they extend across but immediately in front of the chart.

The chart 9a has curved lines thereupon indicated as 6, 7, 8, 9, 10, 11, 12, and 13. These lines are laid out on the chart 9a by assuming a number of positions for plate 4 and calculating the corresponding position of plate 6a which will gave the desired full number of slices. By choosing suitable positions on plate 4 and by calculating the corresponding positions of plate 6a for slice lines 6, 7, 8, 9, 10, 11, 12, and 13 the entire chart may be calibrated.

The operation of the machine is as follows: bacon slab 5 is placed on the table 2 with one edge thereof against the longitudinally extending fixed stop plate 3. Foot lever 28 is depressed, which action causes plates 4 and 6a to come in contact with the side and top respectively of the bacon slab 5. The intersection of indicating means 7b and 8b when interpreted in connection with lines 11, 12, etc., show the number of slices per unit of weight and said slice thickness for which the chart has been calibrated. When foot pedal 28 is released the tension springs 29 and 41 withdraw the plates 4 and 6a respectively in a direction away from the table on the one hand and the fixed contact member on the other, to wit, from contact with the bacon, and reestablish the machine for another measurement or for subsequent use.

The underlying purpose of this invention is to provide a method and/or means for slicing bacon into quantities of a predetermined number of slices of a predetermined weight by employing machine methods of slicing already in use. The new plan in its perfected form will make possible the commercial packaging of sliced bacon without weighing, except for the check weighing of occasional packages to indicate the performance factor of the machine equipment.

The conditions for the working of this plan are extremely simple and are as follows:

1. Each slab of unsliced bacon will be pressed by suitable means into a rectangular parallelepiped, or any other desired shape or commercial form.

2. The cross-sectional area of the bacon slab will have a predetermined value.

3. The cross-sectional area of each slab of unsliced bacon will be such that a whole number of slices cut from it will weigh the desired amount within the tolerances usually allowed in commercial weighing practice.

4. The general expression for the above relationship, in the instance of a rectangular parallelepiped, is as follows:

$$WTNtd = c$$

in which
W = width of the bacon slab after pressing.
T = thickness of the bacon slab after pressing.
N = number of slices of bacon per package.
t = thickness of bacon slices, to wit, the distance of the longitudinal feed of the slab between each cutting operation.
d = mean density of bacon slices.
c = a constant of desired quantity for the particular package desired. (In commercial practice ½ pound.) (Basis of the package unit.)

Of the above quantities, d is fixed by nature and can be considered for the purposes of this discussion to be a constant.

The thickness of the slices t should also be a constant.

This leaves three quantities over which we have control, they are, W, T, and N. Further, we have the condition that N should be a whole number, such as 8, 9, 10 or 11, or even a less number or a greater number.

Now, with d and t, both constants, the product of W, T, and N must also be a constant. This makes the product of W. T. inversely proportional to N.

In the commercial run of unpressed bacon slabs, the approximate values of W and T will vary between quite wide limits.

However, by suitable pressure means, both dimensions W and T may be independently altered between reasonable limits and if the bacon slabs are at a suitable temperature, they will retain their altered dimensions. Now, by choosing the proper value for N, between the limits of say 8 and 12, inclusively, it will be possible to arrive at values for W and T which will "fit" any commercial slab of bacon with a minimum of pressing deformation. In other words, by selecting suitable values for N, T, and W, it will be possible to press or shape chilled bacon slabs into "shapes" that will slice out N number of slices per half pound within the tolerance allowances; and this with a minimum of change in the dimensions of the bacon slabs during pressing. An approximate temperature at which said pressing or shaping can be carried out in a practical manner is from 10° to 30° Fahrenheit. A good optimum is 28° F. for dry cure bacon.

During the pressing operation which will define, shape and/or "fix" the cross-sectional area of the bacon slabs, the length of the slab will become the variable.

In 1930, the present applicant put into operation a commercially developed system that effected—

(a) the slicing of bacon slabs,
(b) the collecting in group arrangement of the bacon slices as delivered from the slicing machine, and
(c) the wrapping or packaging of each group of slices to provide a wrapped package.

The system just mentioned for the purpose of ready reference may be referred to, and frequently herein is referred to, as the prior or recently developed slicing and packaging system, in differentiation of the same from the new or present method herein outlined.

The prior system employs, and the new system will employ, a slicing machine, suitable feeding means such as is provided with or by a magazine feed by which a continuous supply of bacon slabs will be delivered to the slicing machine, a receiving and/or delivering conveyor means and associated parts, and/or means whereby inspecting of bacon slices can be carried out and whereby wrapping of the groups of bacon slices to provide package units can be accomplished. The prior or recently developed slicing and packaging system is quite fully disclosed in and by patents and patent applications already on file and pending, among which may be included and listed the following; namely:

| Application Serial No. | Filing date | Inventor |
|---|---|---|
| 506,653 | Jan. 5, 1931 | Charles T. Walter. |
| 543,499 | June 11, 1931 | Charles T. Walter. |
| 602,708 | Mar. 31, 1932 | Charles T. Walter. |
| 604,361 | Apr. 11, 1932 | Charles T. Walter. |
| 619,255 | June 25, 1932 | Charles T. Walter. |
| 562,974 | Sept. 15, 1931 | Nicholas J. Dziedzic and Harry H. McKee. |
| 554,628 | Aug. 3, 1931 | Harry H. McKee and Nicholas J. Dziedzic. |

| Patent No. | Dated | Patentee |
|---|---|---|
| 1,868,538 | July 26, 1932 | Harry H. McKee and Nicholas J. Dziedzic. |
| 1,886,926 | Nov. 8, 1932 | Charles T. Walter. |
| 1,973,919 | Sept. 18, 1934 | Cahrles T. Walter. |
| 1,995,048 | Mar. 19, 1935 | Charles T. Walter. |

There will now be indicated how the new method can be embodied in, incorporated with, or employed in conjunction with, the prior or recently developed slicing and packaging system.

The slicing machine proper is and preferably will be of the self-feeding type, designed with a magazine loading device which requires, and will require, only that the bacon slabs be placed into a convenient hopper. The construction is preferably such that a continuous stream of bacon will automatically pass to, into, and through the slicing machine.

This machine does deliver and preferably will deliver the bacon slices in proper spaced relationship to each other onto a conveyor in group of $n$ slices to each group. Further, the machine is and preferably will be equipped with a convenient gear change mechanism by which the number of slices per group ($n$) can be quickly and easily changed to give 7, 8, 9, 10 or 11—or even more—slices per group.

The receiving conveyor is and preferably will be of the improved "self-inverting" type constructed for example, according to the invention of Joseph Bech as set forth in U. S. application, Serial No. 602,960, filed April 4, 1932, Patent No. 1,975,917, patented October 9, 1934, which will require only that the groups of prearranged bacon slices, having been graded and inspected on this same conveyor, have the "Cellophane" or other wrapper placed over them after which the conveyor mechanism will automatically "invert" the bacon and wrapper and deliver the sliced bacon resting upon its wrapper to the next "station" in line.

Up to the present time, this next "station" is or would be the place whereat there takes place or would take place the weighing of the package and the "juggling" of slices to bring about a combination of slices which will give approximately the desired weight. How effective or ineffective this present system is, can be readily ascertained by carefully check weighing a large enough number of packages going to the trade. If enough "time" is spent in "juggling" each package to insure no under weight and a reasonable over weight, the process becomes more expensive from the labor standpoint. If the average time to "juggle" a package is reduced to what appears to be a more reasonable figure, the loss is taken in giving away over weight and also, in general, some short weight packages result.

It is at this point that the invention of applicant's new method becomes or will become effective. It functions or will function as follows:

Suppose, for example, it is desired to package light weight bacon bellies, such bellies as will (for example) slice out 22 slices per pound or 11 slices per ½ pound. As explained above, the bacon slabs will have been pressed in accordance with the conditions which will cause them to slice out 11 slices per ½ pound within the commercial weight tolerances. Because the finished package, in this case, will contain 11 slices, the machine will be set to deliver 10 slices per group. This will require that one slice be added to each group delivered by the machine and is done for the purpose of permitting the extreme flank-end slices and brisket-end slices to be uniformly distributed throughout the packages from the center of the slab. This distribution of "end slices" throughout the remaining groups will in no way alter the volumetric weighing equation because, as pointed out above, the cross-sectional area of the bacon slabs will be uniform throughout their entire length. Any unevenness in the extreme ends of the slabs will be of no consequence because the extreme ends are not packed as "fancy bacon" but are included in some lower grade.

With this arrangement, it will be advisable to sort, classify, distribute, assemble and/or arrange the bacon slabs into classes in accordance with their cross-sectional area so that the machine line may be operated for reasonable periods of time with a given number of slices per group.

An inspector placed along the conveyor line can keep a running check on the machine performance by check weighing an occasional package. By check weighing one package from each slab, any possible mix-up in slab classification can be readily detected and the error immediately rectified.

After passing the inspector, it is the plan to have the "Cellophane" wrapped packages pass into a folding machine, which will automatically complete the package—a similar folding machine may also be applied to the ½ pound carton line.

Further, there is under contemplation the submitting of every package to the functional operation of an automatic check-scaling machine which will pass for shipment only those packages falling within a predetermined weight tolerance and will reject all packages either over or under these limits.

From the above, it is apparent that if this volumetric weighing plan is applied to its full value, or to the extent it is ultimately possible to so employ it, it will do much to improve the present over and under weight conditions of finished packages, it will save much in labor costs, and it will further add another important automatic element and improved feature to the said prior or recently developed bacon slicing and packaging system, and will lead to uniformity of weight in the successive packages.

In operating according to the method of the present invention, it will be noted that the following fundamental steps are to be adhered to, although some of the steps, more particularly the latter steps herein recited can be modified, changed or even omitted:

1. The bacon slabs should be selected of such thickness and breadth, to wit, of such cross-sectional area, that they can be pressed so as to assume or insure when pressed a desired standard cross-sectional area, and also shape, if desired.

2. The bacon slabs thus selected, either as selected or as being selected, must be pressed so that each will have the same cross-sectional area and preferably so as to have the same breadth, the same thickness and the same cross-sectional configuration.

3. This pressing is preferably carried out when the bacon slabs have a temperature of approximately 28° Fahrenheit, or thereabouts, to wit, such a temperature as is obtained by the chilling of the slabs if they are not already sufficiently cold.

4. The pressed slabs, preferably while fairly cool, are fed in end to end—preferably abutting—arrangement to the cutting element.

5. The slabs thus successively fed are cut into slices, the slices are received, one after the other, on a receiving and delivering conveyor, whereupon they are received—preferably in spaced group arrangement—with the slices in each group overlapping.

6. In general, the slices in the several groups are inspected while on the receiving and delivering conveyor and one—or possibly more—previously cut slice—or slices—is—or are—added to each group in order that the several slices in any one group will approach in quality and kind the slices in any other group and also in order to make up for each particular group the weight desired therein thus leading to uniformity of the packaged product.

7. The inspected and fully assembled group when finally completed is preferably enclosed in a suitable wrapper such as is provided by the transparent "Cellophane" wrapper.

8. The new scheme also contemplates the weighing—automatically or otherwise—at intervals or the continuous weighing in an automatic machine of the wrapped group or package as delivered from the slicing and packaging system.

It will be noted from what has preceded that an important underlying characteristic of the invention resides in the selecting of bacon slabs having cross-sectional areas within certain limits, the successively cutting of said slabs into slices and the assembling of these slices into groups which have a definite number of slices therein in order to provide the material for successive packages or units of constant predetermined package weight.

What is claimed is:

1. The method which comprises selectively collecting bacon slabs according to their cross sectional area, successively re-shaping said selected slabs of bacon under the influence of a pressing action to produce a series of bacon slabs having the same uniform dimensions and simultaneously measuring and indicating the weight of the slab and number of slices to be subsequently cut from the slab, feeding the individual reshaped and weighed slabs successively to a slicing machine to produce slices of uniform thickness and of the same volume and collectively of the same weight as the respective slab and as previously measured and indicated, delivering the slices of each individual sliced slab in group arrangement to a receiving means in groups of slices the same in number and of a weight fixed by and in accordance with the weight volume determined at the time of said re-shaping step.

2. The method which comprises selectively collecting bacon slabs according to their cross sectional area, successively re-shaping said selected slabs of bacon under the influence of a pressing action to produce a series of individual bacon slabs of uniform dimensions and simultaneously measuring and indicating the number of uniformly cut slices to be cut per unit of slab weight, and subsequently slicing the slab into uniform slices in accordance with the measurement and indication given at the time of re-shaping the slab.

3. The method which comprises selectively collecting bacon slabs according to their cross sectional area, successively re-shaping said selected slabs of bacon under the influence of a pressing action to produce a series of bacon slabs of uniform dimensions and simultaneously measuring and indicating the weight of the re-shaped bacon slab and the number of slices of uniform thickness to be cut from the slab, then feeding the individual re-shaped and weighed slabs successively to a slicing machine to produce slices of uniform thickness and of the same volume and collectively of the same weight as the respective re-shaped slab, delivering the slices of each individual sliced slab in group arrangement to a receiving means in groups of slices the same in number and of a weight fixed by and in accordance with the weight volume determined at the time of the re-shaping step, and finally collecting and packaging said groups of slices so that the same number of slices are included in each package and all of such packages corresponding substantially in weight volume.

4. The method which comprises selectively collecting bacon slabs according to their cross sectional area, then successively pressing the selected slabs while cool so that they may have the same dimensions and simultaneously determining and indicating the weight of the slab and the number of uniformly cut slices to be cut from the slab, delivering the slices of each slab in group arrangement to a receiving means, adding at least one slice to each group to complete the group, and finally wrapping each group thus formed.

5. The method which comprises selectively collecting bacon slabs according to their cross sectional area and simultaneously pressing each slice while cool and indicating the weight of the slab and the number of uniform slices to be cut from the slab, then successively feeding the slabs in a cooled condition to a slicing machine whereby they are sliced so as to produce slices of the same volume, then delivering the slices of each slab in group arrangement to a receiving means in group arrangement, and finally wrapping each group of slices of each slab.

CHARLES T. WALTER.